(12) United States Patent
Nabeel et al.

(10) Patent No.: US 11,784,953 B2
(45) Date of Patent: Oct. 10, 2023

(54) SYSTEMS AND METHODS FOR ENCRYPTED MESSAGE FILTERING

(71) Applicants: Qatar Foundation for Education, Science and Community Development, Doha (QA); Stevens Institute of Technology, Hoboken, NJ (US)

(72) Inventors: Mohamed Nabeel, Doha (QA); Issa Khalil, Doha (QA); Ting Yu, Doha (QA); Haipei Sun, Doha (QA); Hui Wang, Doha (QA)

(73) Assignees: QATAR FOUNDATION FOR EDUCATION, SCIENCE AND COMMUNITY DEVELOPMENT, Doha (QA); STEVENS INSTITUTE OF TECHNOLOGY, Hoboken, NJ (US)

( * ) Notice: Subject to any disclaimer, the term of this patent is extended or adjusted under 35 U.S.C. 154(b) by 0 days.

(21) Appl. No.: 18/103,046

(22) Filed: Jan. 30, 2023

(65) Prior Publication Data
US 2023/0171214 A1    Jun. 1, 2023

Related U.S. Application Data

(63) Continuation of application No. 17/490,252, filed on Sep. 30, 2021, now Pat. No. 11,570,132.

(60) Provisional application No. 63/085,279, filed on Sep. 30, 2020.

(51) Int. Cl.
*H04L 51/212* (2022.01)
*H04L 51/23* (2022.01)
*G06N 20/00* (2019.01)
*G06F 18/22* (2023.01)

(52) U.S. Cl.
CPC ............ *H04L 51/212* (2022.05); *G06F 18/22* (2023.01); *G06N 20/00* (2019.01); *H04L 51/23* (2022.05)

(58) Field of Classification Search
CPC ..... H04L 51/212; H04L 51/23; H04L 51/234; H04L 51/42
See application file for complete search history.

(56) References Cited

U.S. PATENT DOCUMENTS

| | | |
|---|---|---|
| 7,287,060 B1 | 10/2007 | McCown et al. |
| 8,566,938 B1 | 10/2013 | Prakash et al. |
| 8,959,159 B2 | 2/2015 | Vitaldevara et al. |
| 9,838,349 B2 | 12/2017 | Parthasarathy et al. |
| 9,961,029 B2 | 5/2018 | Dulitz et al. |
| 10,181,957 B2 | 1/2019 | Srivastava |
| 2012/0131107 A1 | 5/2012 | Yost |
| 2016/0014151 A1 | 1/2016 | Prakash |
| 2019/0199745 A1* | 6/2019 | Jakobsson ........... H04L 63/1483 |

* cited by examiner

*Primary Examiner* — Kostas J Katsikis
(74) *Attorney, Agent, or Firm* — K&L Gates LLP

(57) ABSTRACT

The present disclosure provides new and innovative systems and methods for filtering encrypted messages. In an example, a computer-implemented method includes obtaining a message, determining sender profiling features of the message, determining enterprise graph features of the message, determining header features of the message, determining a message flag based on the sender profiling features, the enterprise graph features, and the header features, and processing the message based on the message flag.

20 Claims, 9 Drawing Sheets

| Emails | No. | Feature | Domain | Description |
|---|---|---|---|---|
| $E_{SNDR}$ | 1 | SENDER_NUM_EMAIL | $\mathbb{R}^+$ | Average number of emails per day (at logarithmic scale). |
| | 2 | SENDER_NUM_BC | $\mathbb{R}^+$ | Number of broadcast emails per day (at logarithmic scale). |
| | 3 | SENDER_TIME_INTV | $\mathbb{R}^+$ | Average time interval between consecutive emails (Equation 3). |
| | 4 | SENDER_PAST_DISTRUST | $\mathbb{R}^+$ | Number of unsolicited emails in the training data (at logarithmic scale). |
| | 5 | SENDER_SIM_UA | [0,1] | Similarity to historical value(s) of user_agent field. |
| | 6 | SENDER_SIM_PATH | [0,1] | Similarity to historical value(s) in path field. |
| | 7 | SENDER_SIM_MSGID | [0,1] | Similarity to historical value(s) in msg_id field. |
| | 8 | SENDER_SIM_HELO | [0,1] | Similarity to historical value(s) in helo field. |
| $E_{SNDR \rightarrow SUB}$ | 9 | EMAIL_IS_BCAST | {0,1} | Whether the email is a broadcasting email with one single recipient. |
| $E_{SNDR \rightarrow RCV R}$ | 10 | RECVER_NUM_EMAIL | $\mathbb{R}^+$ | Average number of emails per day (at logarithmic scale). |
| | 11 | RECVER_NUM_BC | $\mathbb{R}^+$ | Number of broadcast emails per day (at logarithmic scale). |
| | 12 | RECVER_TIME_INTV | $\mathbb{R}^+$ | Average time interval between emails (Equation 3). |
| | 13 | RECVER_SIM_UA | [0,1] | Similarity to historical value(s) in user_agent field. |
| | 14 | RECVER_SIM_PATH | [0,1] | Similarity to historical value(s) in path field. |
| | 15 | RECVER_SIM_MSGID | [0,1] | Similarity to historical value(s) in msg_id field. |
| | 16 | RECVER_SIM_HELO | [0,1] | Similarity to historical value(s) in helo field. |

FIG. 5

| Graph | Cat | No. | Feature | Domain | Description |
|---|---|---|---|---|---|
| Sender-recipient Graph $G_{SR}$ | CB | 1 | SR_RANDOMWALK | [0,1] | Random walk relation score among recipients in $G_{SR}$. |
| | CB | 2 | SR_TRANSCLOSURE | [0,1] | Transitive closure relation score among recipients in $G_{SR}$. |
| | EI | 3 | SR_PAGERANK | [0,1] | Average page rank score of recipients in $G_{SR}$. |
| Co-recipient Graph $G_{CR}$ | CB | 4 | RCPT_RANDOMWALK | [0,1] | Random walk relation score among recipients in $G_{CR}$. |
| | CB | 5 | RCPT_TRANSCLOSURE | [0,1] | Transitive closure relation score among recipients in $G_{CR}$. |
| | EI | 6 | RCPT_PAGERANK | [0,1] | Average page rank score of recipients in $G_{CR}$. |

FIG. 6

| Group | No. | Feature | Domain | Description |
|---|---|---|---|---|
| SUBJECT (I) | 1 | SUBJ_ACCOUNT | {0,1} | If subject field has keyword "account". |
| | 2 | SUBJ_APPROVED | {0,1} | If subject field has keyword "approve" or "approval". |
| | 3 | SUBJ_BUY | {0,1} | If subject field has keyword "buy". |
| | 4 | SUBJ_EARN | {0,1} | If subject field has keyword "earn". |
| | 5 | SUBJ_FAMILY | {0,1} | If subject field has keyword "family". |
| | 6 | SUBJ_FREE | {0,1} | If subject field has keyword "free". |
| | 7 | SUBJ_GAPPED | {0,1} | If subject field is gapped by underlines or spaces. |
| | 8 | SUBJ_GUARANTEED | {0,1} | If subject field has keyword "guarantee". |
| | 9 | SUBJ_HELLO | {0,1} | If subject field has keyword "hello". |
| | 10 | SUBJ_MONEY | {0,1} | If subject field has keyword "money". |
| | 11 | SUBJ_ONLY | {0,1} | If subject field has keyword "only". |
| | 12 | SUBJ_OWN | {0,1} | If subject field has keyword "own". |
| | 13 | SUBJ_PLING_QUERY | {0,1} | If subject field has keyword "?" or "!". |
| | 14 | SUBJ_SAVE | {0,1} | If subject field has keyword "save" or "saving". |
| | 15 | SUBJ_STATEMENT | {0,1} | If subject field has keyword "statement". |
| | 16 | SUBJ_HAS_USERNAME | {0,1} | If user nickname in from field shows in subject. |
| | 17 | SUBJ_CODED | {0,1} | If subject field contains non-ASCII characters. |
| | 18 | SUBJ_CAPS_PERCENTAGE | [0,1] | Percentage of capital letters in subject field. |
| | 19 | SUBJ_SPACE_PERCENTAGE | [0,1] | Percentage of white space in subject. |
| NON-SUBJECT (II) | 20 | NS_CC_NUMBER | N | Number of recipients in cc field. |
| | 21 | NS_CC_EMPTY | {0,1} | If the cc field exists but empty. |
| | 22 | NS_DATE_INVALID | {0,1} | If the format of sending timestamp is invalid. |
| | 23 | NS_DATETZ_INVALID | {0,1} | If the format of sending timezone is invalid. |
| | 24 | NS_FROM_2ADDR | {0,1} | If from field contains more than one email address. |
| | 25 | NS_FROM_CODED | {0,1} | If from field is coded with non-ASCII char set after decoding. |
| | 26 | NS_FROM_FREE | {0,1} | If from field contains keyword "free". |
| | 27 | NS_FROM_NOREPLY | {0,1} | If from field contains keyword "no-reply". |
| | 28 | NS_FROM_OFFERS | {0,1} | If from field contains keyword "offer". |
| | 29 | NS_FROM_MIXED | {0,1} | If from field contains numbers mixed in with letters. |
| | 30 | NS_FROM_NO_LOWER | {0,1} | If from field doesn't have lower case letter. |
| | 31 | NS_FROM_NOADDR | {0,1} | If from field doesn't have a valid address. |
| | 32 | NS_FROM_NOUSER | {0,1} | If from field doesn't have a user nickname. |
| | 33 | NS_INREPLYTO | {0,1} | If in_reply_to field exists. |
| | 34 | NS_MAILFROM_BOUNCE | {0,1} | If mail from field has keyword "bounce". |
| | 35 | NS_MSGID_NO_AT | {0,1} | If message_id field does not have "@". |
| | 36 | NS_MSGID_NO_HOST | {0,1} | If message_id field does not have a valid domain. |
| | 37 | NS_REPLYTO_MIXED | {0,1} | If reply_to field exists and contains numbers mixed with letters. |
| | 38 | NS_REPLYTO_NOADDR | {0,1} | If reply_to field exists but no valid address. |
| | 39 | NS_TO_MISSING | {0,1} | If to field is missing. |
| | 40 | NS_TO_NO_ADDR | {0,1} | If the to field does not exist or has no valid address. |
| | 41 | NS_TO_SORTED | {0,1} | If more than 2 recipients in to field and in alphabetical order. |
| | 42 | NS_WEBMAIL_TRUE | {0,1} | If is_webmail field is true (email was sent from a web interface). |
| DEPENDENCY [1, 25] | 43 | DEP_MAILFROM_FROM [25] | [0,1] | Similarity between mail from field address and field from address. |
| | 44 | DEP_MAILFROM_HELO [25] | [0,1] | Similarity between mail from field and helo field. |
| | 45 | DEP_MAILFROM_REPLYTO [25] | [0,1] | Similarity between mail from field and field reply_to (if exists). |
| | 46 | DEP_MSGID_HELO [25] | [0,1] | Similarity between message_id field and field helo. |
| | 47 | DEP_IN_FUTURE [1] | {0,1} | If the sending timestamp is in the future of receiving time stamp. |

FIG. 8

SYSTEMS AND METHODS FOR ENCRYPTED MESSAGE FILTERING

CROSS-REFERENCE TO RELATED APPLICATIONS

The instant application is a continuation of U.S. patent application Ser. No. 17/490,252, filed on Sep. 30, 2021, entitled "Systems and Methods for Encrypted Message Filtering", which claims priority to U.S. Provisional Patent Application No. 63/085,279, entitled "Encrypted Email Filtering System and Method" and filed Sep. 30, 2020, the disclosures of which are hereby incorporated by reference in their entireties.

TECHNICAL FIELD

The instant application relates to communication services and more specifically to detecting and/or filtering unwanted messages in electronic message systems.

BACKGROUND

End-to-end email encryption (E2EE) ensures that an email could only be decrypted and read by its intended recipients. Given the increasingly strict privacy regulations, E2EE's strong security guarantee is particularly desirable for enterprise in the event of breaches: even if an attacker breaks into an email server, under E2EE no contents of emails are leaked. On the other hand, E2EE brings significant challenges for an enterprise to detect and filter unwanted emails (phishing, spams, and other types of unsolicited emails) as typical solutions rely on email contents (e.g., email body and attachments) to derive key indicators of unwanted emails.

SUMMARY

The present disclosure provides new and innovative systems and methods for filtering encrypted messages. In an example, a computer-implemented method includes obtaining a message, determining sender profiling features of the message, determining enterprise graph features of the message, determining header features of the message, determining a message flag based on the sender profiling features, the enterprise graph features, and the header features, and processing the message based on the message flag.

In yet another example, the sender profiling features include a number of unsolicited messages associated with a sender of the message, a similarity score of a path field of the message to a historical path field, and an indication of the message being a broadcast message with a single recipient.

In yet another example, the enterprise graph features include an average page rank score of recipients of the message, a random walk relation score of the recipients of the message, and a transitive closure relation score of the recipients of the message.

In yet another example, the header features include an indication of numbers and letters in a from field of the message, a similarity of a message identifier field of the message and a helo field of the message, and a similarity of the from field of the message and the helo field of the message.

In yet another example, the header features include a percentage of white space in a subject of the message, a percentage of capital letters in the subject of the message, and an indication of a presence of non-ASCII characters in the subject of the message.

In yet another example, the sender profiling features is determined using a first machine classifier, the enterprise graph features is determined using a second machine classifier, and the header features is determined using a third machine classifier.

In yet another example, the sender profiling features, the enterprise graph features, and the header features are determined using a single machine classifier.

In an example, an apparatus includes a processor and a memory storing instructions that, when read by the processor, cause the apparatus to obtain a message, determine sender profiling features of the message, determine enterprise graph features of the message, determine header features of the message, determine a message flag based on the sender profiling features, the enterprise graph features, and the header features, and process the message based on the message flag.

In yet another example, the sender profiling features include a number of unsolicited messages associated with a sender of the message, a similarity score of a path field of the message to a historical path field, and an indication of the message being a broadcast message with a single recipient.

In yet another example, the enterprise graph features include an average page rank score of recipients of the message, a random walk relation score of the recipients of the message, and a transitive closure relation score of the recipients of the message.

In yet another example, the header features include an indication of numbers and letters in a from field of the message, a similarity of a message identifier field of the message and a helo field of the message, and a similarity of the from field of the message and the helo field of the message.

In yet another example, the header features include a percentage of white space in a subject of the message, a percentage of capital letters in the subject of the message, and an indication of a presence of non-ASCII characters in the subject of the message.

In yet another example, the sender profiling features is determined using a first machine classifier, the enterprise graph features is determined using a second machine classifier, and the header features is determined using a third machine classifier.

In yet another example, the sender profiling features, the enterprise graph features, and the header features are determined using a single machine classifier.

In an example, a non-transitory computer readable medium storing instructions that, when executed by one or more processors, cause the one or more processors to perform steps including obtaining a message, determining sender profiling features of the message, determining enterprise graph features of the message, determining header features of the message, determining a message flag based on the sender profiling features, the enterprise graph features, and the header features, and processing the message based on the message flag.

In yet another example, the sender profiling features include a number of unsolicited messages associated with a sender of the message, a similarity score of a path field of the message to a historical path field, and an indication of the message being a broadcast message with a single recipient.

In yet another example, wherein the enterprise graph features include an average page rank score of recipients of the message, a random walk relation score of the recipients of the message, and a transitive closure relation score of the recipients of the message.

In yet another example, wherein the header features are selected from the group including an indication of numbers and letters in a from field of the message, a similarity of a message identifier field of the message and a helo field of the message, a similarity of the from field of the message and the helo field of the message, a percentage of white space in a subject of the message, a percentage of capital letters in the subject of the message, and an indication of a presence of non-ASCII characters in the subject of the message.

In yet another example, wherein the sender profiling features is determined using a first machine classifier, the enterprise graph features is determined using a second machine classifier, and the header features is determined using a third machine classifier.

In yet another example, wherein the sender profiling features, the enterprise graph features, and the header features are determined using a single machine classifier.

Additional features and advantages of the disclosed method and apparatus are described in, and will be apparent from, the following detailed description and the figures. The features and advantages described herein are not all-inclusive and, in particular, many additional features and advantages will be apparent to one of ordinary skill in the art in view of the figures and detailed description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, wherein:

FIG. 5 is a table showing sender profiling features according to an example aspect of the present disclosure;

FIG. 6 is a table showing enterprise graph features according to an example aspect of the present disclosure;

FIG. 8 is a table showing header features according to an example aspect of the present disclosure.

DETAILED DESCRIPTION

Figure 1:
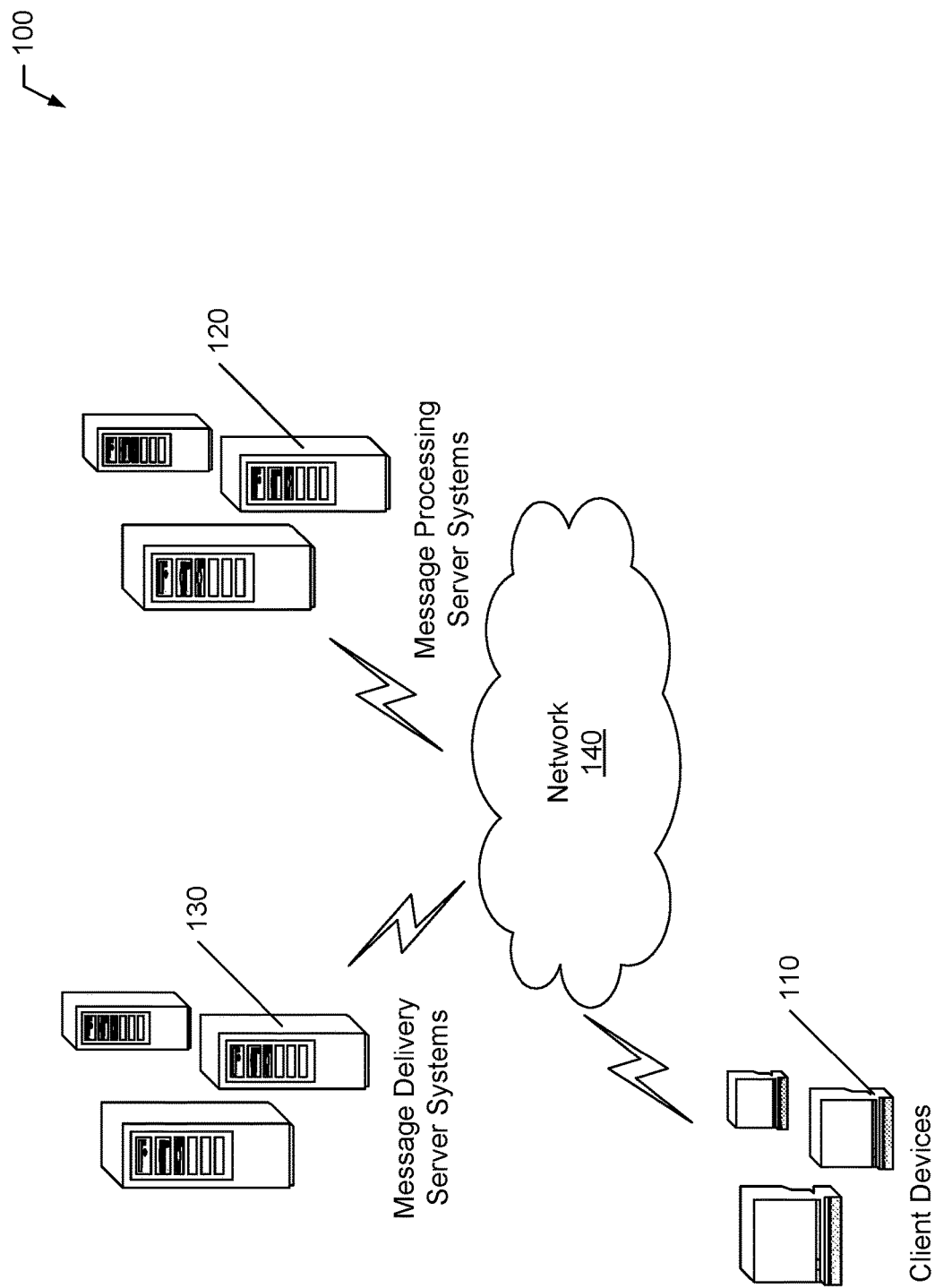
FIG. 1 illustrates a block diagram of an operating environment according to an example aspect of the present disclosure.

Turning now to the drawings, techniques are disclosed for new and innovative systems and methods for filtering encrypted messages. End-to-end email encryption ensures that an email can only be decrypted and read by its intended recipients. Any other entities, including email service providers or even the email servers of the recipients, cannot gain access to the contents of the encrypted emails. As enterprises pay more and more attention to security and privacy and to be compliant with privacy regulations, the strong security guarantee of end-to-end email encryption is particularly desirable in the event of breaches as sensitive email contents will not be leaked even if attackers break into enterprise email servers. However, the adoption of end-to-end email encryption in enterprise is slow due to significant challenges in detect and filter unwanted emails. Unwanted emails can include any emails that are insecure, risky, and/or inappropriate as defined by the policy of an enterprise, which typically include spams, phishing emails, or unsolicited advertisements. Existing email filtering solutions used by enterprises to filter unwanted emails typically rely on the analysis of email contents to identify distinguishing indicators of unwanted emails such as malicious URLs, suspicious text patterns, and/or display patterns resembling those from well-known organizations. However, the contents of an email are unavailable under end-to-end email encryption. Additionally, typical email filtering systems for detecting spam or phishing emails treat each email independently, without considering the context under which the email is received or how it is related to other emails.

Message processing systems in accordance with embodiments of the invention utilize new and novel techniques for processing messages (such as emails or any other type of digital message), including encrypted messages, that allow for the detection and filtering of unwanted messages. Message processing systems can identify communication patterns and relationships among users and/or combine that information with other metadata of messages (e.g. headers and subjects) to distinguish unwanted messages from legitimate messages. Notably, this identification can be done without access to the content (e.g. body) of the message. In particular, these communication patterns and relationships can include a variety of enterprise features such as sender profiling features that capture the patterns of past emails between internal recipients and external senders and enterprise graph features that capture the co-recipient relationship and the sender-recipient relationship between users. Notable, a legitimate message sender sends messages based on certain purposes that are different from that of senders of unwanted emails. Additionally, message processing systems can model and consider the roles of users and their activities and interactions in an enterprise. For example, users in the same department or working on the same project tend to have more overlap in their received emails, while it would be unusual for users who have never communicated with each other before. In other words, the communication patterns and relationships among internal user accounts contain rich and reliable information about benign email communications.

Message processing systems in accordance with embodiments of the invention provide a variety of improvements over existing filtering systems, particularly when dealing with encrypted messages. When dealing with encrypted messages, typical systems are unable to scan the contents of the messages and rely on the headers of the messages. However, these headers are prone to forgery and relying on header information alone is not robust when dealing with adversaries capable of crafting evasive email headers. Furthermore, typical filtering systems rely on email contents in addition to the header information, which is also under the control of the adversaries, and hence can be carefully crafted to evade filtering. By evaluating messages on a variety of message features, including header features, sender profiling features, and enterprise graph features, message processing systems can accurately identify unwanted messages even when some of the features are unavailable or manipulated by adversarial parties. In particular, message processing systems exhibit state-of-the art performance in classifying messages based on sender profiling features and enterprise graph features and therefore robust against adversary manipulation. Accordingly, message processing systems in accordance with embodiments of the invention improve the functionality of computing devices themselves to process messages and provide improved processes for message processing.

A variety of computing systems and processes for filtering encrypted messages in accordance with aspects of the disclosure are described in more detail herein.

Operating Environments and Computing Devices

FIG. 1 illustrates a block diagram of an operating environment 100 in accordance with one or more aspects of the present disclosure. The operating environment 100 can include client devices 110, message processing server systems 120, and/or message delivery server systems 130 in communication via network 140. In many aspects, the message processing server systems 120 and/or message delivery server systems 130 are implemented using a single server. In a variety of aspects, the message processing server systems 120 and/or message delivery server systems 130 are implemented using a plurality of servers. In several aspects, client devices 110 are implemented utilizing the message processing server systems 120 and/or message delivery server systems 130. In a variety of aspects, message processing server systems 120 and/or message delivery server systems 130 are implemented using the client devices 110.

Client devices 110 can generate messages and/or receive messages as described herein. Message delivery server systems 130 can obtain messages from a variety of computing devices, such as client devices, and provide messages to client devices 110 and/or message processing server systems 120 as described herein. Message processing server systems 120 can obtain messages, process messages, and provided the processed messages to message delivery server systems 130 and/or client devices 110 as described herein. Any data described herein can be transmitted between client devices 110, message processing server systems 120, and/or message delivery server systems 130 via network 140. The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. In several embodiments, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure. It will be appreciated that the network connections shown in the operating environment 100 are illustrative, and any means of establishing one or more communications links between the computing devices may be used.

Figure 2:
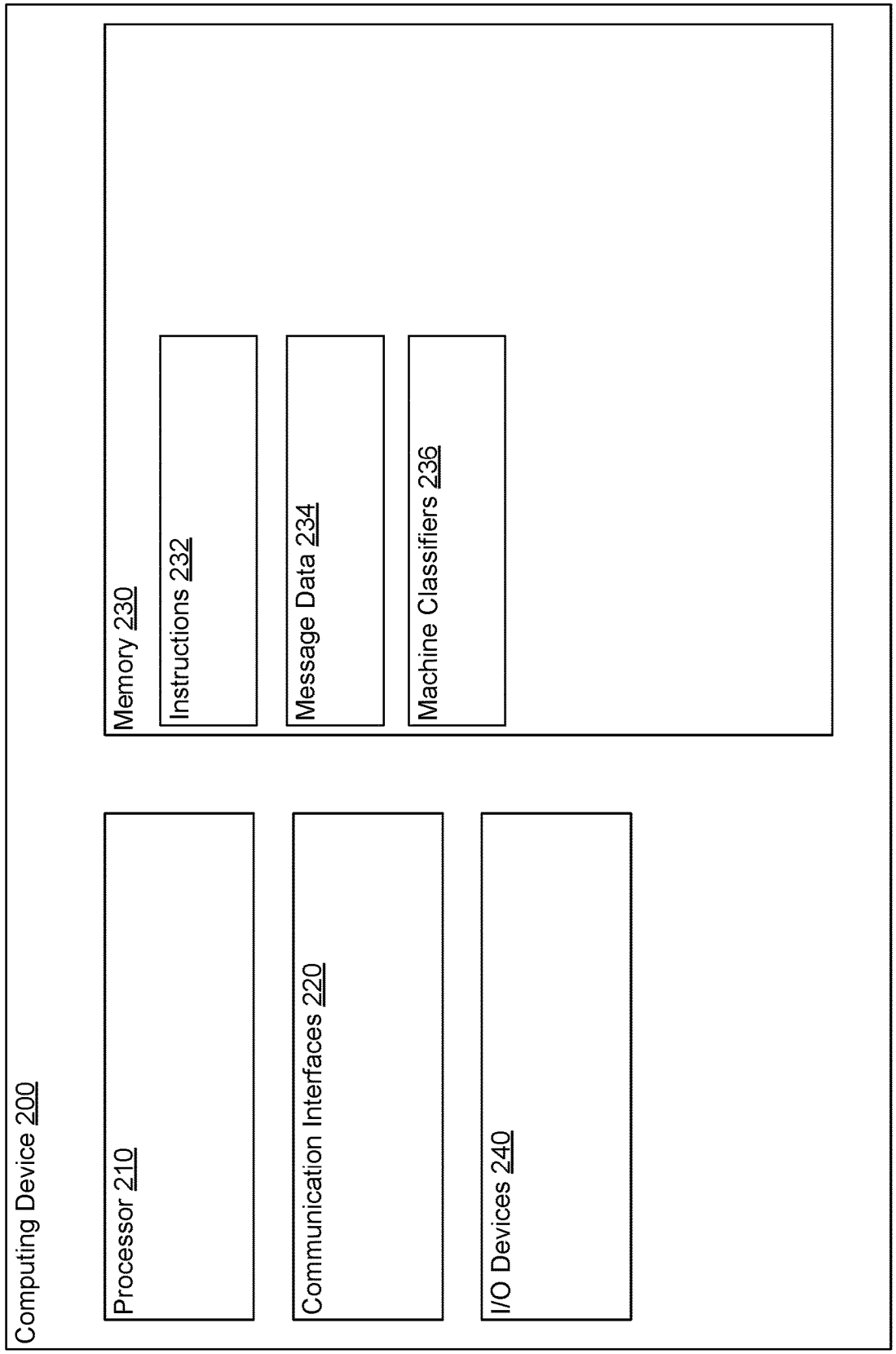
FIG. 2 illustrates a block diagram of a computing device according to an example aspect of the present disclosure.

Any of the devices shown in FIG. 1 (e.g. client devices 110, message processing server systems 120, and message delivery server systems 130) can include a single computing device, multiple computing devices, a cluster of computing devices, and the like. A conceptual illustration of a computing device in accordance with an embodiment of the invention is shown in FIG. 2. The computing device 200 includes a processor 210 in communication with memory 230. The computing device 200 can also include one or more communication interfaces 220 capable of sending and receiving data and one or more I/O devices 240 capable of capturing data. In a number of embodiments, the communication interface 220 and/or I/O devices 240 are in communication with the processor 210 and/or the memory 230. In several embodiments, the memory 230 is any form of storage storing a variety of data, including, but not limited to, instructions 232, message data 234, and/or machine classifiers 236. In many embodiments, instructions 232, message data 234, and/or machine classifiers 236 are stored using an external server system and received by the computing device 200 using the communications interface 220. The processor 210 can be directed, by the instructions 232, to perform a variety of message processing processes based on the message data 234 and/or machine classifiers 236 as described herein.

The processor 210 can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. Memory 230 can include a volatile or non-volatile memory device, such as RAM, ROM, EEPROM, or any other device capable of storing data. Communication devices 220 can include network devices (e.g., a network adapter or any other component that connects a computer to a computer network), a peripheral component interconnect (PCI) device, storage devices, disk drives, printer devices, keyboards, displays, etc. I/O devices 240 can include sound or video adaptors, still imaging devices, video imaging devices, environmental sensors, biometric sensors, and the like.

Although specific architectures for computing devices in accordance with embodiments of the invention are conceptually illustrated in FIG. 2, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In several aspects, the computing device 200 provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure. In a variety of embodiments, a memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Processing Encrypted Messages

Figure 3:
FIG. 3 is a conceptual illustration of an electronic message according to an example aspect of the present disclosure.

Simple Mail Transport Protocol (SMTP) is the dominant protocol today to exchange emails between mail servers across organizational boundaries. Enterprise systems typically filter incoming emails over SMTP before the emails reach its internal email servers to be retrieved by client devices. FIG. 3 is a conceptual illustration of an electronic message according to an example aspect of the present disclosure. The message 300 includes a header 310 and a body 312. The body 312 is often referred to as the content of the message 300. The header 310 contains important information for message delivery, such as the addresses and names of the sender and recipients, subjects, delivery dates, the communicating servers, and their corresponding timestamps. As the header 310 contains vital information for message delivery and needs to be updated when the message 300 is delivered from one server to another, the header 310 is typically not encrypted. However, some or all of the header fields can be encrypted or removed while remaining compliant with SMTP. The body 312 contains everything else in the message 300, including attachments. In many embodiments, the body 312 can include non-textual information such as images, documents, and videos.

A typical email system in an enterprise setting includes received messages from the external Internet and the enterprise Intranet. Messages from the external Internet go through a firewall before they reach the Intranet. Security applications (e.g., spam detection software), which are typically installed behind the firewalls, can filter out unwanted messages so that only benign messages can reach the Intranet. The filtered messages are normally stored in log files. Most enterprises archive these logs for a considerable period depending on legal regulations and an enterprise's security policy. An enterprise typically has its own email domain name (e.g. abc.com) and its users have their unique email addresses under the enterprise domain name (e.g. alice@abc.com). An incoming messages can be considered external (e.g. when the sender's domain is different from that of the enterprise) or internal (e.g. when its sender domain address is the same as that of the enterprise). All incoming external messages have to go through the firewall before they reach the Intranet, while internal messages are transmitted within the Intranet. Message processing systems can filter incoming external messages and/or utilize internal messages to identify features about the communication pattern among internal users that can be used to train a variety of machine classifiers and/or identify unusual patterns indicative of unwanted messages.

In particular, message processing systems in accordance with embodiments of the invention can detect and filter a variety of messages, such as messages crafted by an adversary to trick enterprise users into performing an action, such as opening an email attachment, clicking a link, providing personal information. By utilizing internal emails to train the message processing systems, a variety of sender profiles and enterprise graphs learned from the historical data (e.g. internal messages) reflect benign behaviors. In this way, message processing systems can detect unwanted messages whose contents are encrypted and inaccessible.

Message processing systems can take a collection of messages $E_R$ that include a set of labeled external messages and a set of past internal messages of an enterprise as the input. The message processing systems can derive a set of features from $E_R$ for a classifier $\mathcal{H}$. For any unlabeled external message e in the testing dataset $E_T$, $\mathcal{H}$ can label e as 1 if it is predicted as an unwanted message and 0 if it is a wanted (e.g. not unwanted) message. However, it should be noted that any label, such as labels between 0 and 1, can be used in accordance with embodiments of the invention. In many embodiments, thresholds can be used to determine when a labeled message is wanted or unwanted. For example, a message being labeled as 0.51 may be unwanted, while a message labeled 0.49 or 0.50 may be wanted. In a variety of embodiments, message processing systems can extract a set of content-agnostic features $\vec{x}$ from $E_R$ and train one or more machine classifiers $\mathcal{H}$ to label $E_T$ based on the features x.

The extracted features x can be categorized into two types, non-enterprise features that rely on a message itself and enterprise features that capture the external and internal communication patterns between users. In several embodiments, non-enterprise features are extracted directly from the headers of the messages in $E_R$. In a variety of embodiments, enterprise features depend on not only the message itself but also the historical external and internal messages of an enterprise. In many embodiments, these features are mostly independent with low redundancy. To extract these features, message processing systems can analyze header information of the messages in $E_R$, and output header features, group external messages in $E_R$ by their senders and extract sender profiling features from the groups to capture the historical interaction of an external sender, and/or construct enterprise communication graphs from the internal messages in $E_R$ and use these graphs to extract enterprise graph features. The header features can be referred to as non-enterprise features, while the sender profiling features and the enterprise graph features can be referred to as enterprise features. As described herein, although message contents are not accessible in encrypted messages, a message's recipients can reveal the intention of the message, and thus can be useful to distinguish benign messages from unwanted messages.

Figure 4:
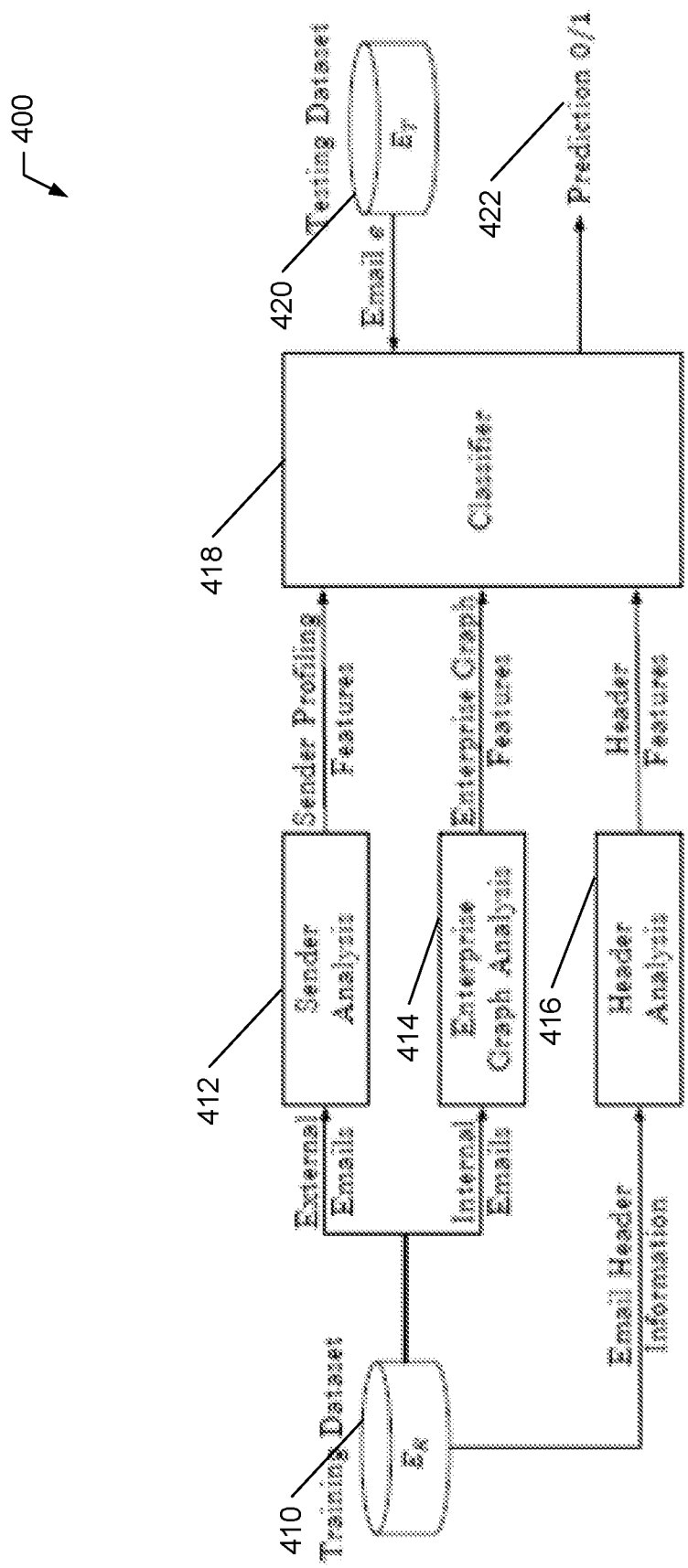
FIG. 4 is a conceptual illustration of the flow of data in a message filtering system according to an example aspect of the present disclosure.

FIG. 4 is a conceptual illustration of the flow of data in a message filtering system according to an example aspect of the present disclosure. The data flow 400 includes a training dataset 410. The training dataset 410 can include internal emails, external emails, and header information. The external information can be analyzed 412 to generate sender profiling features. The internal emails can be analyzed 414 to generate enterprise graph features. The header information can be analyzed 416 to generate header features. The sender profiling features, enterprise graph features, and header features can be used to train a machine classifier 418. An email 420 can be provided to the machine classifier 418 and classified by the machine classifier 418 to generate prediction 422. The prediction 422 can include a label for the email 420 and/or a confidence metric indicating the likelihood that the generated label corresponds to the ground truth label for the email 420.

Enterprise features can be separated into two types depending on the source of the enterprise features. Sender profiling features can extracted from the external messages and describe the external senders based on how they communicated with internal users by messages. Enterprise graph features can be extracted from internal enterprise messages and describe the internal users based on how they communicated with each other. For a training dataset $E_R$, and a new given message e, three types of messages can be selected from $E_R$:

$E_{SNDR} \subseteq E_R$ consists of all emails in $E_R$ that have the same sender as e;

$E_{SNDR+SUB} \subseteq E_R$ consists of all emails in $E_R$ that have the same sender and subject as e; and $E_{SNDR+RCVR} \subseteq E_R$ consists of all emails in $E_R$ that have the same sender and recipient as e.

For each type of message, a set of features can be derived for the input message e. In a variety of embodiments, the sender profiling features include 16 different features. FIG. 5 is a table showing sender profiling features according to an example aspect of the present disclosure. A variety of features can derived from $E_{SNDR}$. In several embodiments, unwanted messages behave a distinctive pattern—they are often sent in a large number by the same sender during a short time duration. Three features (Features 1-3 in table 500) can be used to identify this pattern. Feature 1 measures the average number of messages per day sent by the sender. Feature 2 counts the number of broadcast messages in the training data. Intuitively, a sender who sends out a large number of broadcast messages is more suspicious. Since the number of messages (for both Features 1 and 2) could be quite large for some senders, instead of returning the actual count k, take the logarithmic scale of k and return a score $s_k$ defined as:

$$s_k = \log(1+k)$$

Feature 3 in table 500 measures the average time interval between the consecutive messages received within a time window of T days in $E_{SNDR}$. To measure the average time interval, first calculate the average daily time interval. Suppose there are n messages in $E_{SNDR}$ on the i-th day $$e_{i,1}, e_{i,2}, \ldots e_{i,n}$$

sorted by their timestamps. The function t(•) can return the timestamp of a message e. The average daily time interval $d_i$ can be calculated as:

$$d_i = \begin{cases} \frac{1}{n-1} \sum_{j=2}^{n} t(e_{i,j}) - t(e_{i,j-1}), & \text{if } n > 1 \\ 86{,}400, & \text{if } n \in \{0, 1\} \end{cases}$$

In particular, when there is no message or only one message in a day, the time interval $d_i$ can be set to 86,400 (representing 86,400 seconds, i.e., 24 hours). Based on the average daily time interval, the average time interval $s_{intv}$ can be calculated as the average of $d_i$ in T days, where T can be a parameter for the time window size:

$$s_{intv} = \begin{cases} \dfrac{\sum_{i=1}^{T} d_{c-i} \cdot 1(d_{c-i} \neq 86400)}{\sum_{i=1}^{T} 1(d_{c-i} \neq 86400)}, & \text{if } \exists\, 1 \leq i \leq T,\ d_{c-i} \neq 86400 \\ 86400, & \text{otherwise} \end{cases}$$

In order to make the score representative, the value of T should not be too small. In several embodiments, T=14, or a 2-week time window.

Feature 4 of table 500 can to measure the distrust of the sender from its history. This feature returns the number of unwanted messages in $E_{SNDR}$ sent by the same sender of the input message e. In several embodiments, since the count can be large, the logarithmic scale can be used.

Features 5-8 of table 500 measure the similarity between the input message and past benign (e.g. wanted or not unwanted) messages from the same sender. In many embodiments, higher similarity indicates that the input message e is less likely to be unsolicited. Since the content of the messages is not available, message similarity can be determined based on four header fields:

$$HF = \{user\_agent, path, message\_id, helo\}$$

The user_agent field can indicate the name and version of the sender's message client. The path field can indicate the IP addresses of all hops along the transmission path of the message. The message_id field can indicate a hash string as a prefix (may have delimiter between hash strings), an "@" character, and a domain address as the suffix. The hash string and the domain address are generated by the sender's message server. The helo field can indicate the domain address of the sender's message server.

For each header field $f \in HF$, a feature can be derived that measures the similarity between the input message e and the messages in $E_{SNDR}$ on the field f by calculating the similarity score $s_{sim}$. Formally, let $E_{SNDR}^-$ be the set of messages in $E_{SNDR}$ that are labeled as benign, and $T_\beta$ as the collection of unique values of the field f that appeared greater than or equal to $\beta$ times in $E_{SNDR}^-$, where $\beta > 0$ can be a user-specified threshold. Values whose frequency is less than $\beta$ can be filtered because intuitively these values cannot represent the values that appear frequently in benign messages. In many embodiments, $\beta = 10$. For each value $\gamma \in T_\beta$, we measure the similarity between the input message e and $\gamma$ at field f as $\text{sim}(\hat{\gamma}, \gamma)$, where $\hat{\gamma}$ is the value of field f in the input message e. The function sim( ) can be defined by any string similarity metric such as a Levenshtein distance or Jaccard similarity. The similarity score $s_{sim}$ between the input message e and $E_{SNDR}^-$ on the field f can be calculated as:

$$s_{sim} = \begin{cases} \max_{\gamma \in T_\beta} \text{sim}(\gamma, \hat{\gamma}), & \text{if } |T_\beta| > 0 \\ 0, & \text{if } |T_\beta| = 0 \end{cases}$$

In several embodiments, the highest similarity out of all comparisons because the message is highly likely to be a solicited message as long as it is similar to at least one message in $E_{SNDR}^-$.

Some features can be derived from $E_{SNDR+SUB}$, such as feature 9 in table 500. This feature captures an important pattern of unwanted messages: unlike broadcast messages that include multiple recipients in one single message, unwanted messages are typically sent separately to multiple recipients within a short time window, with each message including a single recipient but the same subject and same sender. Thus, feature 9 indicates if there are more than two messages in $E_{se+su}$ that satisfy the following two conditions: (1) each message has a single recipient and (2) the messages were sent within a seconds, where α>0 is threshold. In several embodiments α=3,600 (i.e., 1 hour).

A variety of features can be derived from $E_{SNDR+RCVR}$. Even for the same sender, the communication pattern may vary for different recipients. Pairs of senders and recipients can be analyzed to derive the communication patterns for each pair. Features 10-16 in table 500 can be derived from $E_{SNDR+RCVR}$. Similar to the features 1-8 derived from $E_{SNDR}$, these nine features capture the communication patterns of each (sender, receiver) pair as described in table 500.

Given a message e with sender s and its recipients $R=\{r_1, \ldots r_k\}$, intuitively, e is more likely to be unwanted if it is rare for all recipients in R to appear together in the recipient lists of past benign messages. We assume that all internal messages are benign, which is a reasonable assumption as internal messages only involve trusted senders. Based on this assumption, in the enterprise setting, how users are included in the same messages is not random. It is common that there exist implicit working communities (e.g., departments, working units, and project teams) in the enterprise setting. Such community structure will guide the message co-recipient relationship among users. Therefore, features can be derived from the internal messages that can reflect such communities, and thus capture the likelihood that all users in R can appear as the recipients in a benign message. There can be two types of message communication relationships among enterprise employees: sender-recipient relationship, e.g., one sends messages to another; or co-recipient relationship, e.g., users appear in the recipient lists of the same messages. Accordingly, two types of graphs can be used to model these two types of communication relationships among the employees. The graphs include a sender-recipient graph ($G_{SR}$) that models the relationship between senders and recipients in the internal messages and the co-recipient graph ($G_{CR}$) that models the relationship between recipients in the internal messages.

FIG. 6 is a table showing enterprise graph features according to an example aspect of the present disclosure. Six enterprise graph features are shown in table 600. These features into two types: community-based features (features 1, 2, 4, 5) and employee-importance features (features 3 and 6). In the enterprise setting, a benign message tends to be sent to users in the same working communities instead of those who belong to different communities. Furthermore, it is often the case that this community relationship is transitive. Based on these observations, the community-based features can reflect the degree that recipients in the input message belong to the same community according to either the sender-recipient relationship or the co-recipient relationship. Email communications can reveal different levels of importance of employees. A benign message tends to be sent to the users of comparable importance. A message that addresses recipients of significantly different importance (e.g., the CEO and several interns) is unusual and more likely to be unwanted. Accordingly, employee-importance features can be derived from both the sender-recipient graph and the co-recipient graph. A variety of features can be derive from these graphs. A message processing system can take recipient list R of a message e as well as an enterprise graph (either $G_{SR}$ or $G_{CR}$) as input and output a relation score in the range [0, 1] to quantify the likelihood that the recipients in R appear in the recipient list of a benign message based on their prior communications (either sender-recipient or co-recipient) within the enterprise. This calculation can be used to extract the community-based features and/or employee-importance based features. Next, we first describe how to construct the sender-recipient graph and the co-recipient graph. Then we explain how to extract features from these two graphs.

Figure 7:
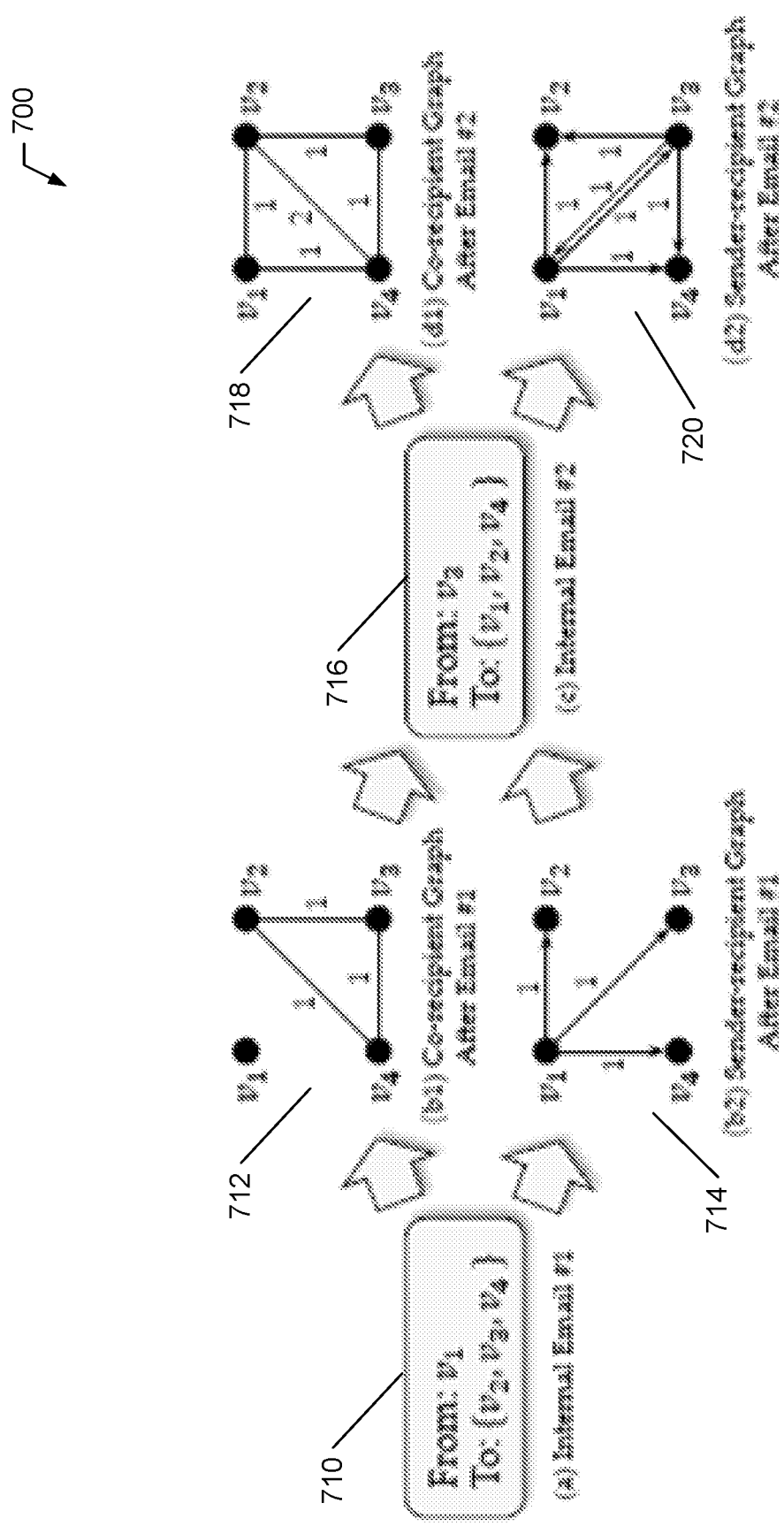
FIG. 7 is a conceptual illustration of co-recipient graphs and sender-recipient graphs according to an example aspect of the present disclosure.

FIG. 7 is a conceptual illustration of co-recipient graphs and sender-recipient graphs according to an example aspect of the present disclosure. A sender-recipient graph $G_{SR}=\{V, E_{SR}\}$ can be constructed. In $G_{SR}$, each vertex $v \in V$ represents an employee in the enterprise. There can be a directed edge $e(v,v') \in E_{SR}$ if user v sends a message to user v'. The weight w of the edge e(v,v') can be set as the total number of messages that user v sends to v'. Example 700 shows a sender-recipient graph 714 constructed from an internal message 710. Sender-recipient graph 720 further shows how the graph 720 is updated based on a second internal message 716. A co-recipient graph $G_{CR}=\{V, E_{CR}\}$ can be constructed where each vertex $v \in V$ corresponds to an employee in the enterprise. There can be an undirected edge $e(v,v') \in E_{CR}$ if v and v' appear in the recipient list of the same internal message. The weight on each edge e(v,v') can be assigned as the total number of messages that include both v and v' in the recipient list. Intuitively, the co-recipient graph captures the fact that if two employees are frequently included in the recipient list of the same message, they are more likely to belong to the same working community (e.g., the same department or the same project team). Co-recipient graph 712 illustrates a co-recipient graph constructed from the message 710. Co-recipient graph 718 shows how the graph 712 is updated based on the second internal message 716.

A variety of techniques can be used to extract community-based features. In several embodiments, one or more scoring schemes, such as random walk (RW) and transitive closure (TC), can be to calculate the degree that all the recipients R in the input message belong to the same community according to either the sender-recipient relationship or the co-recipient relationship. The pairwise relationship score can be calculated for each pair of users in the recipient list v, $v' \in E_R$, which quantifies the likelihood that v and v' appear in the same message considering their past communications with other employees. A global relationship score of R can be calculated based on an aggregation of the pairwise relationship scores. RW and TC can differ on how they measure the pairwise relationship scores, as TC utilizes the transitive property of the graph but RW does not.

In the RW scoring scheme, a random walk can be performed on $G_{SR}$ and $G_{CR}$ respectively, and obtain features 1 and 4 in table 600. RW can take a graph G (either $G_{SR}$ or $G_{CR}$), and a source node $v_i \in G$ as the input. Starting from $v_i$, we traverse randomly to one of its neighbors with probability proportional to the weight of the edge $e(v_i, v_j)$. We continue the traversal and finally terminate after L steps. A node may be visited multiple times during the traversal. We use M[i, j] to denote the number of times $v_j$ is reached in a random walk starting from $v_i$. Note that this relationship is not symmetric, e.g., M[i, j] and M[j, i] may not be equal. Given a message e and its recipient list R, we compute the pairwise co-recipient score $s_{i,j}$ as:

$$s_{i,j} = \begin{cases} 1 & \text{if } i = j \\ 0 & \text{if } v_i \text{ is isolated in } G \text{ and } i \neq j \\ \dfrac{M[i, j]}{\max_{v_k \in R} M[i, k]} & \text{otherwise} \end{cases}$$

-continued $$\frac{M[i, j]}{\max_{v_k \in R} M[i, k]}$$

can be used to make $s_{i,j}$ falls into the range [0, 1]. Finally, we compute the co-recipient score of the recipient list R by random walk $s_{rw}(R)$ as $$s_{rw}(R) = \min_{v_i, v_j \in R} s_{i,j}$$

The minimum pairwise co-recipient score can be used as the score for the whole recipient list as it captures the worst likelihood that the whole recipient list included in a benign message. Intuitively, the lower the score is, the smaller the likelihood that the recipients in R all appear in the same recipient list of a benign message.

In the transitive closure (TC) scoring scheme, a transitive closure can be calculated over $G_{SR}$ and $G_{CR}$ respectively. The TC scoring scheme can be used to derive features 2 and 5 in table 600. TC includes calculating the pairwise co-recipient scores for each pair of recipients in R and calculating the co-recipient score of all users in R by aggregating all pairwise co-recipient scores. In many embodiments, let A be the adjacency matrix of the input graph G (e.g. $G_{SR}$ or $G_{CR}$). A can normalized as:

$$A[i, j] = \frac{w(i, j)}{\sum_{t=1}^{m} w(i, t)}$$

where m is the total number of nodes in the graph and w(i, j) is the weight of edge e(i, j) if the edge exists, or 0 otherwise. The transitive closure of A can be given by $$A^+ = \sum_{t=1}^{m-1} A^i$$

where $A^i = \underbrace{A \times A \ldots A}_{i}$

The pairwise co-recipient score $s_{i,j}$ can be calculated from $A^+$ as described herein and replacing M[i, j] by $A^+[i, j]$. The score $s_{tc}(R)$ can be calculated based on co-recipient scores between users in the recipient list R. The minimum pairwise co-recipient score can be used as the score for the whole recipient list. Formally, the score $s_{tc}(R)$ can be measured as:

$$s_{tc}(R) = \min_{v_i, v_j \in R} s_{i,j}$$

Employee-importance features can also be extracted. In many embodiments, a page rank (PR) scoring scheme can be used to calculate features 3 and 6 in table 600. PR can be used to process input graph G (either $G_{SR}$ or $G_{CR}$) to obtain a score $IS_i$ for each node v. This score reflects the importance of user i based on past internal message communications in an enterprise. The co-recipient score $s_{pr}(R)$ can be calculated for all the users in the recipient list R by page ranking $s_{pr}(R)$ as $$s_{pr}(R) = \min_{v_i \in R} IS_i$$

In several embodiments, only the lowest PR of the recipients is calculated based on the intuition that the lower the PR of a user, the less likely the user receives messages together with other users in R.

A variety of features can be derived from the fields of the message header. These header features can be categorized into three groups: (1) subject features derived from the subject field in the message header, (2) non-subject features derived from all fields in the header except the subject, and (3) dependency features. Dependency features can be cross-field derived features that check consistency between various header fields.

FIG. 8 is a table showing header features according to an example aspect of the present disclosure. The table 800 includes 47 different features. Features 1-19 in table 800 can be extracted from the subject of the message. Features 1-15 check whether the subject contains specific keywords from a blacklist, such as a blacklist suggested by Apache SpamAssassin. The blacklist can include keywords that frequently appear in spam and promotional messages. Each of these features is binary, returning 1 if a particular keyword (e.g., "hello", "save" and "free") appears in the subject field and 0 otherwise. Feature 16 in table 800 is a binary feature with value 1 if the user's nickname in the from field is shown in the subject field. This feature is crafted to capture an observed behavior in some spam and promoting messages in which adversaries include a nickname in the subject as a social motivation to increase the chances of opening the message. Feature 17 returns 1 if the subject contains non-ASCII characters, otherwise returns 0. This feature is motivated by the observation that some promoting messages include emojis in the subject. Feature 18 computes the percentage of capital letters in the subject field, as subjects of unwanted messages (e.g., promotional ones) are likely to contain more capital letters than normal messages. Feature 19 computes the percentage of white spaces in the subject field. It is mainly designed to model unwanted (e.g., spam) messages that use white spaces to separate letters, especially in keywords that appear frequently in the subject field. Adversaries usually use the white spaces trick to evade detection by systems that employ keyword detection against a blacklist.

Features 20-42 in table 800 are the non-subject features. These features are grouped according to the fields from which they are derived. Features 20 and 21 are derived from the cc field. Feature 20 returns the number of recipients in the cc field. This is based on observations that unwanted messages (e.g., spam) are typically sent to a large number of recipients by cc'ing them. Feature 21 captures the behavior in which some unwanted messages include an empty cc field. Features 22 and 23 are extracted from the date field. Each of these two features will return a value of 1 if the format of the timestamp and time zone is invalid according to RFC 2822. Feature 24-32 are extracted from the from field. These features mainly model the coding of the from field (feature 25), check if it contains some specific keyword (features 26-28), if it has some character patterns (features 29-30), and if it has a valid address (feature 31) and a user nickname (features 32). The remaining features are extracted from in_reply_to field (features 33), mailfrom field (features 34), message_id field (features 35-36), reply_to field (features 37-38), to field (features 39-41), and is-webmail field (feature 42). Feature 41 can capture the fact that the alphabetical order among multiple recipients in the to field is a potential indicator of a spam message, since a non-spam message typically contains a list of addresses in random order. Feature 42 is designed to account for the cases when web clients are used to send the unwanted messages. The intuition is that adversaries tend to use webmail services as one of the economic ways to send unwanted messages.

Features 43-47 of table 800 are the dependency features. Dependency features can be derived from individual fields. Dependency features can indicate spam messages. Features 43-46 model the content similarity between a pair of header fields. The content similarity can be measured by any string similarity metrics, e.g., Levenshtein distance and Jaccard similarity. In particular, we consider the consistency between the from and mailfrom fields (feature 43), between the mailfrom and helo fields (feature 44), between the mailfrom and reply_to fields (feature 45), and between the message_id and helo fields (feature 46). Feature 47 captures the temporal dependency between the send and receive timestamps. Intuitively, the sending timestamp should precede that of receiving. However, a phishing message may not show such temporal dependency.

Figure 9:
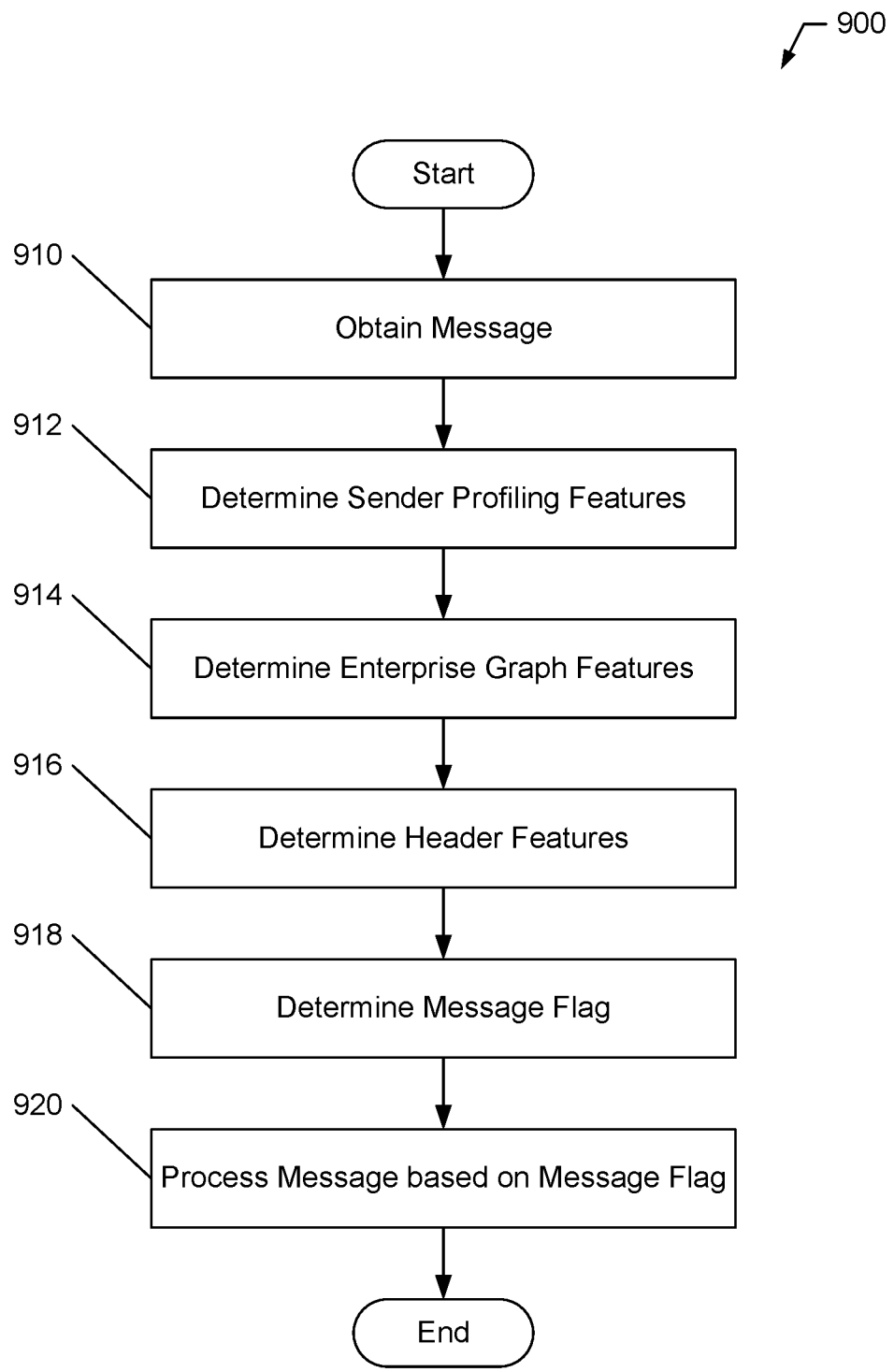
FIG. 9 illustrates a flowchart of a process for filtering encrypted messages according to an example aspect of the present disclosure.

FIG. 9 illustrates a flowchart of a process for filtering encrypted messages according to an example aspect of the present disclosure. Although the process 900 is described with reference to the flowchart illustrated in FIG. 9, it will be appreciated that many other methods of performing the acts associated with the process 900 may be used. For example, the order of some of the blocks may be changed, certain blocks may be combined with other blocks, one or more blocks may be repeated, and some of the blocks described are optional. The process 900 may be performed by processing logic that may include hardware (circuitry, dedicated logic, etc.), software, or a combination of both.

A message can be obtained (910). The message can be any digital message such as an email, short message service (SMS) message, instant message, and the like. The message can include a sender, one or more recipient, a header, and/or a body. Some or all of the header and/or body can be encrypted as described herein.

Sender profiling features can be determined (912). The sender profiling features can indicate various properties of the sender and/or recipients as described herein, particularly with respect to FIG. 5. Enterprise graph features can be determined (914). The enterprise graph features can indicate various properties of the relationship between the sender and recipients and/or the properties of the sender and/or recipients within an organization (e.g. enterprise) as described herein, particularly with respect to FIGS. 6 and 7. Header features can be determined (916). The header features can indicate various properties of particular fields within the header of the message and/or indicate consistency checks between various fields in the header as described herein, particularly with respect to FIG. 8.

It should be noted that one or more machine classifiers can be used to determine the sender profiling features, enterprise graph features, and/or header features. The machine classifiers can determine the features and/or a confidence metric indicating the likelihood that the features are present and the generated label for the feature corresponds to a ground truth label for the feature. In several embodiments, a machine classifier can be trained to extract each class of feature from a message. In a number of embodiments, a single machine classifier can be trained to extract each of the features from a message. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

A message flag can be determined (918). In a number of embodiments, the message flag is determined based on the sender profiling features, the enterprise graph features, and/or the header features using one or more machine classifiers as described herein. In several embodiments, the message flag is a binary indicator if a message is an unwanted message or not an unwanted message. In a variety of embodiments, the message flag can have multiple values. A variety of threshold values can be used to determine the message flag for the message. For example, the message flag can be based on a score (generated based on the sender profiling score, the enterprise graph score, and the header score) between 0 and 100 and the message flag can have three values—spam, caution, and clear. When the score is between 0 and 25, the message flag can be set to spam, when the score is between 26 and 75, the message flag can be set to caution, and when the score is between 76 and 100, the message flag can be set to clear. However, it should be noted that any values (and/or number of values) for the message flag and/or thresholds to determine the message flag can be used in accordance with embodiments of the invention.

A message can be processed (920). The message can be processed based on the message flag. In a number of embodiments, a message having a message flag indicating that the message is unwanted can be dropped and not delivered to a message delivery server system and/or client device. In several embodiments, a message having a message flag indicating that the message is not unwanted can be delivered to a message delivery server system and/or client device. In a variety of embodiments, the message flag is incorporated into the header for the message and delivered along with the message. In this way, a message client can be used to read and display the message flag via a user interface. In many embodiments, any attachments and/or hyperlinks can be removed from a message when the message flag indicates that the flag is unwanted. When the attachments and/or hyperlinks are in the encrypted portion of the message, the message flag can be used by an application displaying the message to remove the attachments and/or hyperlinks once the message has been decrypted. However, it should be noted that any processing of the message based on the message flag can be performed in accordance with embodiments of the invention.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
   obtaining a message;
   determining sender profiling features of the message;
   determining enterprise graph features of the message, wherein the enterprise graph features comprise:
   an average page rank score of recipients of the message,
   a random walk relation score of the recipients of the message, and
   a transitive closure relation score of the recipients of the message;
   determining header features of the message;
   determining a message flag based on the sender profiling features, the enterprise graph features, and the header features; and
   processing the message based on the message flag.

2. The computer-implemented method of claim 1, wherein the sender profiling features comprise a number of unsolicited messages associated with a sender of the message and a similarity score of a path field of the message to a historical path field.

3. The computer-implemented method of claim 1, wherein the sender profiling features comprise an indication of the message being a broadcast message with a single recipient.

4. The computer-implemented method of claim 1, wherein the header features comprise an indication of numbers and letters in a from field of the message, a similarity of a message identifier field of the message and a helo field of the message, and a similarity of the from field of the message and the helo field of the message.

5. The computer-implemented method of claim 1, wherein the header features comprise a percentage of white space in a subject of the message, a percentage of capital letters in the subject of the message, and an indication of a presence of non-ASCII characters in the subject of the message.

6. The computer-implemented method of claim 1, wherein the sender profiling features are determined using a first machine classifier, the enterprise graph features are determined using a second machine classifier, and the header features are determined using a third machine classifier.

7. The computer-implemented method of claim 1, wherein the sender profiling features, the enterprise graph features, and the header features are determined using a single machine classifier.

8. An apparatus, comprising:
   a processor; and
   a memory storing instructions that, when read by the processor, cause the apparatus to:
   obtain a message;
   determine sender profiling features of the message;
   determine enterprise graph features of the message, wherein the enterprise graph features comprise:
   an average page rank score of recipients of the message,
   a random walk relation score of the recipients of the message, and
   a transitive closure relation score of the recipients of the message;
   determine header features of the message;
   determine a message flag based on the sender profiling features, the enterprise graph features, and the header features; and
   process the message based on the message flag.

9. The apparatus of claim 8, wherein the sender profiling features comprise a number of unsolicited messages associated with a sender of the message and an indication of the message being a broadcast message with a single recipient.

10. The apparatus of claim 8, wherein the sender profiling features comprise a similarity score of a path field of the message to a historical path field.

11. The apparatus of claim 8, wherein the header features comprise an indication of numbers and letters in a from field of the message, a similarity of a message identifier field of the message and a helo field of the message, and a similarity of the from field of the message and the helo field of the message.

12. The apparatus of claim 8, wherein the header features comprise a percentage of white space in a subject of the message, a percentage of capital letters in the subject of the message, and an indication of a presence of non-ASCII characters in the subject of the message.

13. The apparatus of claim 8, wherein the sender profiling features are determined using a first machine classifier, the enterprise graph features are determined using a second machine classifier, and the header features are determined using a third machine classifier.

14. The apparatus of claim 8, wherein the sender profiling features, the enterprise graph features, and the header features are determined using a single machine classifier.

15. A non-transitory computer readable medium storing instructions that, when executed by a processor, cause the processor to perform operations comprising:
   obtaining a message;
   determining sender profiling features of the message;
   determining enterprise graph features of the message, wherein the enterprise graph features comprise:
   an average page rank score of recipients of the message,
   a random walk relation score of the recipients of the message, and
   a transitive closure relation score of the recipients of the message;

determining header features of the message;

determining a message flag based on the sender profiling features, the enterprise graph features, and the header features; and processing the message based on the message flag.

16. The non-transitory computer readable medium of claim 15, wherein the sender profiling features comprise a similarity score of a path field of the message to a historical path field and an indication of the message being a broadcast message with a single recipient.

17. The non-transitory computer readable medium of claim 15, wherein the sender profiling features comprise a number of unsolicited messages associated with a sender of the message.

18. The non-transitory computer readable medium of claim 15, wherein the header features are selected from the group consisting of an indication of numbers and letters in a from field of the message, a similarity of a message identifier field of the message and a helo field of the message, a similarity of the from field of the message and the helo field of the message, a percentage of white space in a subject of the message, a percentage of capital letters in the subject of the message, and an indication of a presence of non-ASCII characters in the subject of the message.

19. The non-transitory computer readable medium of claim 15, wherein the sender profiling features are determined using a first machine classifier, the enterprise graph features are determined using a second machine classifier, and the header features are determined using a third machine classifier.

20. The non-transitory computer readable medium of claim 15, wherein the sender profiling features, the enterprise graph features, and the header features are determined using a single machine classifier.

* * * * *